UNITED STATES PATENT OFFICE.

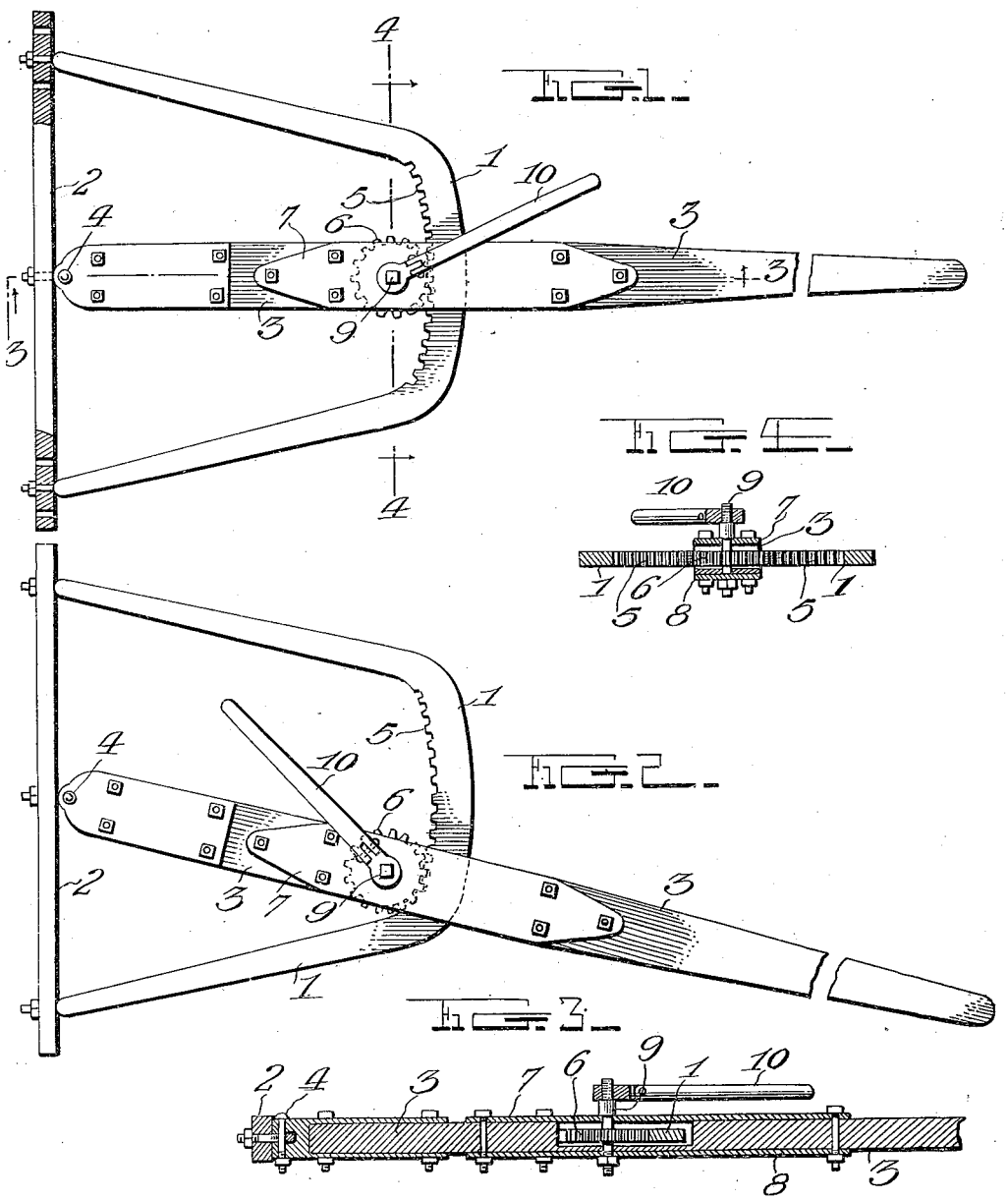

JOHN SCHULER, OF THAWVILLE, ILLINOIS.

ADJUSTABLE COUPLING FOR TRACTION-ENGINES.

1,128,259. Specification of Letters Patent. Patented Feb. 9, 1915.

Application filed May 21, 1914. Serial No. 840,103.

*To all whom it may concern:*

Be it known that I, JOHN SCHULER, a citizen of the United States, residing at Thawville, in the county of Iroquois and State of Illinois, have invented certain new and useful Improvements in Adjustable Couplings for Traction-Engines; and I do declare the following to be a full, clear, and exact description of the invention, such as will enable others skilled in the art to which it appertains to make and use the same.

This invention relates to couplings for hitching traction engines to threshing machines, portable saw mills and other farm machinery for transportation and has for its object the provision of a construction by which the machine may be steered independently of the course of the traction engine to enable the engine to make sharp turns in the road when necessary without danger of ditching the trailing machine and also to assist in setting the machine in position for operation.

With the above and other objects in view, the invention consists of certain novel features of construction, combination and arrangement of parts as will be more fully described and claimed.

In the accompanying drawings: Figure 1 represents a plan view of this improved coupling in its normal position; Fig. 2 is a similar view showing the coupling swung to one side in the position assumed when making a turn; Fig. 3 is a longitudinal section taken on the line 3—3 of Fig. 1; and Fig. 4 is a transverse section taken on the line 4—4 of Fig. 1.

In the embodiment illustrated, an arch shaped bar 1 is connected at its opposite ends to a cross bar 2 which is adapted to be connected with the axle of the vehicle or machine to be drawn. The ends of this arched bar 1 are here shown adjustably connected with said bar 2 and a pole 3 extends longitudinally in a plane at right angles to said bar 2 being pivotally and adjustably connected therewith midway the length of the bar as shown at 4.

The inner curved edge of the crown of this arched bar 1 is provided with a plurality of rack teeth 5 with which meshes a cog wheel 6 which is revolubly mounted in a recess in the pole 3 in position to engage said teeth 5. By so arranging these teeth on the inner edge of the yoke 1, the machine may be more easily controlled and it is more convenient for the operator. This pole 3 has the recess therein sufficiently large to receive the cog wheel 6 and the toothed cross bar of the arch 1 and to permit play of the arch and cog wheel therein. This recess in the pole is covered by plates 7 and 8 bolted to opposite sides of the pole and which form bracing means for said pole as well as guides for the arch.

The cog wheel 6 is mounted on a stub shaft 9 which extends transversely through the pole 3 and projects some distance above the upper face thereof. A jointed lever 10 is mounted on the projecting end of this stub shaft 9 being fixed thereto in any suitable manner and adapted when turned, to turn said cog wheel to adjust the position of the pole relatively to the arch as shown in Fig. 2. This steering lever 10 is positioned suitably for engagement by the driver to adapt him to throw the lever to the right or left as may be desired when turning a corner or a sharp angle in the road and this may be accomplished without making any material change in the direction of the engine. It is also convenient in backing up a machine or for placing it in position.

From the above description, it will be obvious that this coupling is adjustable and may be made to fit any kind of machine on which it is desired to use a coupling of this character.

Particular emphasis is laid upon the fact that the gear wheel 6 abuts the rear edge of the crown of the arch shaped bar 1 and meshes with the teeth on this rear edge, since by this construction rotation of the gear will not only adjust the bar 2 and tongue 3 relatively, but when forward strain is applied to this tongue, such strain will not be imparted totally to the pivot 4, but will be equally distributed upon this pivot and upon the arched bar. Were the gear wheel located in front of said arched bar, it will be seen that it could not accomplish such results as are obtained by the positioning shown in the drawings, but that other means would probably be necessary for relieving a portion of the strain from the pivot 4.

I claim as my invention:

A coupling of the class described comprising a transverse beam, an arch shaped bar extending forwardly therefrom and having the ends of its arms secured thereto, at transverse spaced points, the crown of said arch shaped bar having a plurality of rack teeth on its rear edge, a tongue pivoted to and extending forwardly from said beam, said tongue being pivoted to swing laterally in a horizontal plane and having a portion of its length lying contiguous to said crown of the arch shaped bar, an upright shaft revolubly mounted on said portion of the tongue and disposed in rear of said crown, means to rotate said shaft, and a gear wheel secured to the latter and abutting the toothed rear edge of said crown, whereby forward strain of said tongue will be equalized upon its pivot and upon the arch shaped bar.

In testimony whereof I have hereunto set my hand in presence of two subscribing witnesses.

JOHN SCHULER.

Witnesses:
JAMES KERSHY,
WILBUR KERNS.